(12) United States Patent
Sjursen et al.

(10) Patent No.: US 6,410,997 B1
(45) Date of Patent: Jun. 25, 2002

(54) POWER SOURCE FOR A HEARING AID

(75) Inventors: Walter Paul Sjursen, Washington Crossing, PA (US); Gary John Hollingsworth, Rocky Hill, NJ (US); Marvin Allan Leedom, Princeton, NJ (US); Derek Dwayne Mahoney, Manalapan, NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/124,948

(22) Filed: Jul. 30, 1998

(Under 37 CFR 1.47)

Related U.S. Application Data

(60) Provisional application No. 60/082,249, filed on Apr. 17, 1998.

(51) Int. Cl.[7] .................................................. H02J 7/00
(52) U.S. Cl. ........................ 307/130; 307/140; 307/150
(58) Field of Search ............................... 307/10.7, 130, 307/125, 140, 116, 150; 340/636; 361/92; 320/134, 136; 429/27, 97

(56) References Cited

U.S. PATENT DOCUMENTS

| | | | | |
|---|---|---|---|---|
| 3,409,802 A | * | 11/1968 | Savage | 371/31 |
| 3,754,182 A | * | 8/1973 | Morris et al. | 323/17 |
| 4,037,399 A | * | 7/1977 | Chihara | 340/249 |
| 4,043,110 A | * | 8/1977 | Chihara | 340/249 |
| 4,118,544 A | | 10/1978 | Przybyla et al. | 429/27 |
| 4,137,557 A | * | 1/1979 | Ciarniello et al. | 361/92 |
| 4,177,327 A | * | 12/1979 | Mathews et al. | 429/27 |
| 4,224,539 A | * | 9/1980 | Musa et al. | 340/636 |
| 4,301,380 A | * | 11/1981 | Thomas | 340/636 |
| 4,409,538 A | * | 10/1983 | Tabata | 320/11 |
| 4,493,880 A | * | 1/1985 | Lund | 429/97 |
| 4,905,116 A | * | 2/1990 | Whidden et al. | 361/92 |
| 5,073,721 A | * | 12/1991 | Terrill et al. | 307/10.7 |
| 5,073,837 A | * | 12/1991 | Baek | 361/92 |
| 5,093,212 A | * | 3/1992 | Lloyd et al. | 429/27 |
| 5,179,337 A | * | 1/1993 | Staarman et al. | 320/13 |
| 5,473,496 A | * | 12/1995 | Rouy | 361/92 |
| 5,536,977 A | | 7/1996 | Williams | 307/43 |
| 5,615,076 A | | 3/1997 | Slepian et al. | 361/90 |
| 5,617,285 A | * | 4/1997 | Zitta | 361/92 |
| 5,668,465 A | | 9/1997 | May | 320/39 |
| 5,898,293 A | * | 4/1999 | Tamai et al. | 320/136 |
| 5,902,467 A | * | 5/1999 | Wang et al. | 204/415 |

FOREIGN PATENT DOCUMENTS

EP 534 804 A1 9/1992

* cited by examiner

*Primary Examiner*—Fritz Fleming
(74) *Attorney, Agent, or Firm*—Hamilton, Brook, Smith & Reynolds, P.C.

(57) ABSTRACT

A metal-air cell for powering electronic components in a hearing aid device. The metal-air cell has a flex circuit inside containing an anode mixture. The flex circuit comprises a flexible substrate having a cathode electrode area at one end of the substrate, an anode electrode area at another end of the substrate and an electronic components area in between. The flexible substrate is disposed within the housing. The cathode electrode area is near a top surface of the housing, and the anode electrode area is near a bottom surface of the housing and in contact with the anode mixture. The cathode electrode area has air flow means for permitting air into the housing. An isolation means between the cathode electrode area and the anode mixture is provided for preventing contact between the cathode electrode area and the anode mixture.

27 Claims, 7 Drawing Sheets

POWER SOURCE FOR A HEARING AID

This application claims the benefit under 35 U.S.C. 119(e) of the filing date of U.S. provisional patent application No. 60/082,249, filed Apr. 17, 1998.

TECHNICAL FIELD

The present invention relates, in general, to power sources for hearing aids and, more specifically, to capacitor power sources, metal-air batteries and switches for batteries.

BACKGROUND OF THE INVENTION

Batteries may serve as a power source for hearing aids. In some hearing aids the electronics of the device are placed inside the battery chemistry. Because the battery cannot be replaced, the hearing aid must be discarded when the battery energy is depleted. A target life for such a disposable hearing aid may be 30 days. Most hearing aids use replaceable batteries. The replaceable battery may be inserted into the hearing aid, thereby providing the power source to operate the device.

Replaceable zinc-air batteries are commonly used to power hearing aids. Prior to use, the battery is sealed with a pull-tab that prevents environmental effects, such as relative humidity and temperature, from affecting the shelf-life of the battery. To activate the battery, the pull-tab is removed and air (hence oxygen) is allowed into the battery. The battery is then inserted into the hearing aid to provide the power source for operating the hearing aid.

The nominal open-circuit voltage of a zinc-air cell (battery) may be 1.4 volts. The open-circuit voltage is measured after the pull-tab is removed and oxygen is allowed into the cell. Prior to removing the pull-tab, the open-circuit voltage of the zinc-air cell may also be 1.4 volts, because there may be some oxygen trapped inside the cell. As long as no current is allowed to flow through the cell, the cell voltage will remain at 1.4 volts and the shelf-life period will not be shortened. In disposable hearing aids in which the load (circuit) may be permanently connected to the battery, current may flow through the battery. The battery will then discharge and the desired shelf-life period may not be achieved.

It has been proposed that if oxygen was completely depleted from the cell, a long shelf-life would be achieved. This hypothesis is based on the assumption that there would be no potential difference to cause current to flow through the load in the absence of oxygen. It may be shown, however, that the voltage of some oxygen deprived zinc-air cells is not zero volts, but approximately 0.39 volts. As a potential difference may be present, a load connected to the cell will cause current to flow, thus discharging the cell.

Metal-air cells, such as zinc-air or aluminum-air cells, use air to activate the cell. A typical air cathode may be composed of four primary components:

(1) A carbon matrix formed by activated carbon blended with an aqueous Teflon slurry, washed, dried, and pressed into a current collector; the carbon matrix may include a catalyst, usually a transition metal oxide;
(2) a nickel mesh which provides mechanical strength and serves as the current collector;
(3) a microporous, hydrophobic membrane, typically polytetrafluoroethylene; and
(4) an anode/cathode separator which prevents direct contact between the anode and cathode.

Zinc-air cells are activated when air, and in particular oxygen, is allowed to enter the cell. In some zinc-air cells, a pull-tab covers one or more small openings that allow air to reach the air-cathode assembly. The pull-tab may be designed to allow air to diffuse slowly into the cell. With the pull-tab sealing the cell, the cell is oxygen deprived and may not support the same current as an unsealed cell.

The chemical reaction associated with an oxygen-enriched zinc-air cell is as follows:

| cathode reaction | $\frac{1}{2}O_2 + H_2O + 2e^- \rightarrow 2OH^-$ | $E^\circ = 0.40$ V |
|---|---|---|
| anode reaction | $Zn \rightarrow Zn^{2+} + 2e^-$ | $E^\circ = 1.25$ V |
| | $Zn^{2+} + 2OH^- \rightarrow Zn(OH)_2$ | |
| | $Zn(OH)_2 \rightarrow ZnO + H_2O$ | |
| overall reaction | $Zn + \frac{1}{2}O_2 \rightarrow ZnO$ | $E^\circ = 1.65$ V |

When a cell is completely deprived of oxygen, the cell becomes a zinc-hydroxide cell, wherein the cathode material is hydroxide taken from the electrolyte. The chemical reaction associated with the zinc-hydroxide cell is as follows:

| cathode reaction | $2H_2O + 2e^- \rightarrow H_2 + 2OH^-$ | $E^\circ = -0.828$ V |
|---|---|---|
| anode reaction | $Zn + 4OH^- \rightarrow ZnO_2^{-2} + 2H_2O + 2e^-$ | $E^\circ = 1.21$ V |
| overall reaction | $Zn + 2OH^- \rightarrow ZnO_2^{-2} + H_2$ | $E^\circ = 0.388$ V |

A pull-tab that is impermeable to oxygen may be used to seal the air openings. Instead of an oxygen impermeable pull-tab, or in addition to such a pull-tab, the cell (battery) may be sealed in a nitrogen-filled, oxygen impermeable bag. The relative humidity of the nitrogen gas within the bag may be, for example, between 40 and 60 percent so as not to dry out the cell. When the sealed bag is opened or the pull-tab is removed, oxygen diffuses into the cell, the cell reverts to a zinc-air cell, and the voltage may increase, for example, from about 0.39 volts to more than 4 volts.

Hearing aids may typically be designed to operate in a range varying from approximately 1.5 volts down to approximately 1.1 volts. Batteries are replaced when the voltage in the battery falls below 1.1 volts. U.S. Pat. No. 5,712,919, issued to Ruhling discloses a hearing aid powered by a single capacitor or several capacitors connected in parallel and operating at 1.5 volts. When the capacitor is discharged to about 1.1 volts and no longer useful, only 46.2% of its energy has actually been used.

Assuming a constant current load, the operating life of the capacitor-powered hearing aid is given by:

$$\Delta t = C \cdot \Delta v / I \qquad (1)$$

where C is the capacitance, $\Delta v$ is allowable voltage drop (e.g. 1.5V−1.1V=0.4V), and I is the load current. Equation (1) may be rearranged to calculate the capacitance for a desired operating time as follows:

$$C = I \cdot \Delta t / \Delta v \qquad (2)$$

for example, $\Delta v=0.4$ volts, $\Delta t=1$ day (86400 seconds), and $I=500$ $\mu A$ (micro-amperes), a capacitance of 108 F (farads) is realized. Double-layer capacitors which have large capacitances relative to their sizes are commercially available. For example, Panasonic, Part Number EEC-A0EL106, is a 10 F, 2.5 V capacitor. By using eleven of these capacitors a total capacitance of 110 F may be obtained. The total physical volume of eleven such capacitors is 98.0 cm$^3$. It will be appreciated that a typical in-the-canal (ITC) hearing aid may occupy a volume of only about 1 cm$^3$. Thus, the configuration described may not be feasible for use in an ITC hearing aid.

As previously stated, the difficulty with the disposable hearing aid is that its permanent battery may discharge during the shelf-life period. To ensure that the hearing aid lasts for its target life of 30 days, for example, a switch may be included in the device to keep the battery from discharging. Two types of switches may be used: an "on-off" switch or an "on-only" switch. An "on-only" switch may be used to activate the device once. Once put into service the device remains "on." An "on-off" switch, in addition to activating the device once, may allow the hearing aid to be turned off during non-use periods, for example at sleep time.

SUMMARY OF THE INVENTION

The present invention provides a metal-air cell for powering electronic components in a hearing aid device. The metal-air cell has a flex circuit inside a housing containing an anode mixture. The flex circuit comprises a flexible substrate having a cathode electrode area at one end of the substrate, an anode electrode area at another end of the substrate and an electronic components area in between. The flexible substrate is disposed within the housing. The cathode electrode area is near a top surface of the housing, and the anode electrode area is near a bottom surface of the housing and in contact with the anode mixture. The cathode electrode area has air flow means for permitting air into the housing. An isolation means between the cathode electrode area and the anode mixture is provided for preventing contact between the cathode electrode area and the anode mixture.

In another embodiment, this invention provides an automatic switch for controlling power in a hearing aid having a load and a battery source comprising (1) a voltage comparator connected to the battery source and having a reference voltage level of comparing a voltage level of the battery source to the reference voltage level to generate a control signal, and (2) a switch responsive to the control signal to selectively connect the battery source to the load. The switch connects the battery source to the load when the battery voltage level exceeds the reference voltage level by a predetermined voltage and the switch disconnects the battery source from the load when the battery voltage level is below the reference voltage level.

In yet another embodiment, this invention provides a source of operating potential supplying a predetermined voltage level to a load in a hearing aid comprising at least one storage capacitor having a stored voltage level higher than the predetermined voltage level, and a DC/DC converter connected between the load and the storage capacitor for converting the stored voltage level to the predetermined voltage level.

In still another embodiment, this invention provides an "on-off" switch. In an in-the-canal hearing aid device having a metal air cathode isolated from an internal circuit and microphone and a cathode eyelet press-fitted into the metal air cathode to form an opening for the microphone. The "on-off" switch comprises (1) a first spring electrically connected to the internal circuit at a first end and disposed adjacent to the cathode eyelet at a second end, (2) a second spring electrically connected to the cathode eyelet at a third end and urging away from the second end at a fourth end toward, and (3) actuating means positioned at the second spring for selectively moving the second end. The metal air cathode is electrically connected to the internal circuit when the actuating means moves the fourth end toward the second end of the metal air cathode and is electrically isolated from the internal circuit when the actuating means moves the fourth end away from the second end.

It is understood that the foregoing general description and the following detailed description are exemplary, but are not restrictive, of the invention.

BRIEF DESCRIPTION OF THE DRAWINGS

The invention is best understood from the following detailed description when read in connection with the accompanying drawing. Included in the drawing are the following figures.

DETAILED DESCRIPTION OF THE INVENTION

Figure 1:
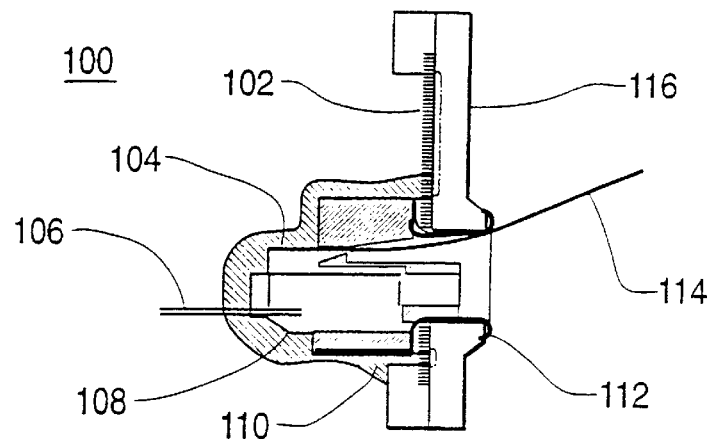
FIG. 1 is a cross-section of a disposable hearing aid showing an "on-only" switch in accordance with an embodiment of the present invention.

In accordance with one embodiment of the present invention, FIG. 1 shows a switch that penetrates the battery chemistry of a hearing aid and allows an internal circuit to be turned "on-only." As shown, hearing aid 100 includes a microphone 108, a circuit board 106, a switch spring 104, and a cathode eyelet 112 which penetrates cathode 102 of the battery. Cathode eyelet 112 is shown press-fit into cathode 102 and is designed to be the only connection to the cathode. A switch is formed by spring 104 that is soldered to the circuit board at one end and makes contact with cathode eyelet 112 at the other end. All internal parts may be completely covered with epoxy 110 to keep the battery chemistry from leaking outside end plate 116 of the hearing aid.

It will be understood that switch spring 104 is insulated everywhere from cathode 102 except at the end making contact with cathode eyelet 112. Insulating tab 114 is placed between switch spring 104 and cathode eyelet 112, resulting in an open-circuit. Maintaining the open-circuit helps increase the shelf life of the device. The hearing aid is activated when a user pulls out insulating tab 114. The hearing aid remains "on" until the battery is completely discharged.

Figure 2:
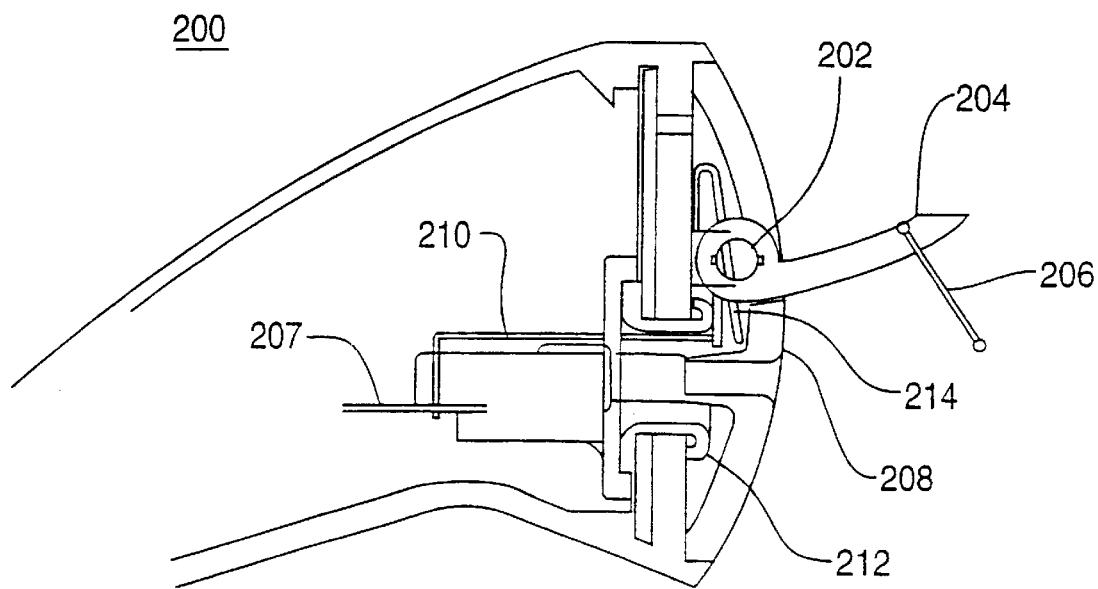
FIG. 2 is a cross-section of a disposable hearing aid, showing an "on-off" switch in accordance with an embodiment of the present invention.

Referring to FIG. 2, there is shown hearing aid 200, which is similar to the hearing aid shown in FIG. 1, but has an "on-off" switch. As shown, switch spring 210 is straightened so that it does not make contact with cathode eyelet 212 and consequently no battery connection is made. Switch spring 210 is connected at one end to circuit board 207, but does not make contact at the other end with cathode eyelet 212. Second spring 214 is positioned so that one of its ends is in contact with cathode eyelet 212, while its other end is positioned in close proximity to switch spring 210. Since second spring 214 urges away from switch spring 210, it does not make contact with switch spring 210, and consequently, no battery connection is made. Second spring 214 may be forced by cam 202 to make the battery connection when lever 204 is closed. Thus, a connection to the battery may be established by pushing lever 204 towards the hearing aid.

Still referring to FIG. 2, extraction line 206 is pivoted on lever 204 and allows a user to pull the hearing aid out of the ear. While pulling on extraction line 206, lever 204 is pulled away from cover plate 208. This, in turn, releases second spring 214 from making contact with switch spring 210. Thus, the hearing aid may be turned "off" when it is pulled out of the ear.

Figure 3:
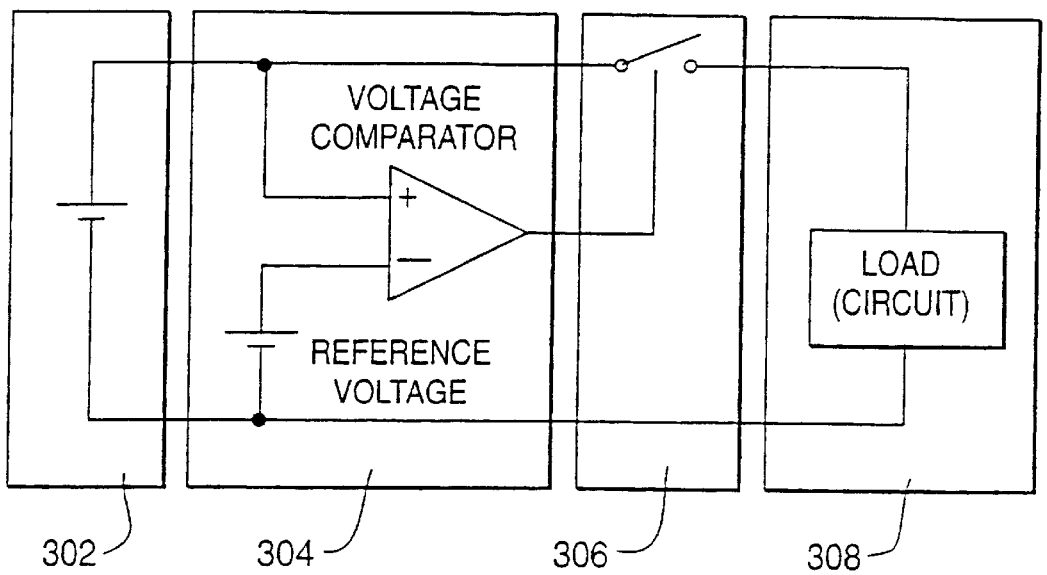
FIG. 3 is a circuit diagram of a power source and an automatic switch for a hearing aid in accordance with an embodiment of the present invention.

It is also advantageous to provide an "on-off" switch for a hearing aid which may operate automatically without user intervention. FIG. 3 shows such an automatic switch. As shown, battery source 302, such as a zinc-air cell, is connected through switch 306 to load 308. Voltage comparator 304 is connected to the battery source for monitoring the voltage of battery source 302. Voltage comparator 304 includes a reference voltage. When the cell voltage is less than the reference voltage, switch 306 is turned "off" and the load is disconnected from the cell. When the cell voltage is greater than the reference voltage, switch 306 is turned "on" and the load is connected to the cell.

It is advantageous to operate voltage comparator 304 at low voltages, 0.39 volts for example, because it is always connected to the battery. It is also advantageous that the voltage comparator draw little current, and preferably no current, so as not to drain the battery during storage. It will be appreciated that the reference voltage need not be precisely set. The voltage comparator may provide appropriate control functions by turning the switch "off" when the cell voltage is, for example, between 0.39 volts and 0.6 volts. Further, the voltage comparator may turn the switch "on" when the cell voltage is, for example, between 0.9 volts and 1.4 volts.

An automatic switch of this type may be used, for example, to disconnect the hearing aid from the battery when the battery is deprived of oxygen. Thus, the hearing aid may be provided with a facility, such as air holes that may be selectively opened and closed, to preserve the life of the battery when the hearing aid is not in use and, an automatic switch, as described below, may be used to sense that the air holes have been closed by monitoring the battery voltage, and disconnect the load from the battery when the hearing aid is not in use. This circuit also operates to disconnect the load from the battery before the hearing aid is first used, thus increasing the shelf life of an integrated hearing aid-battery combination.

Figure 4A:
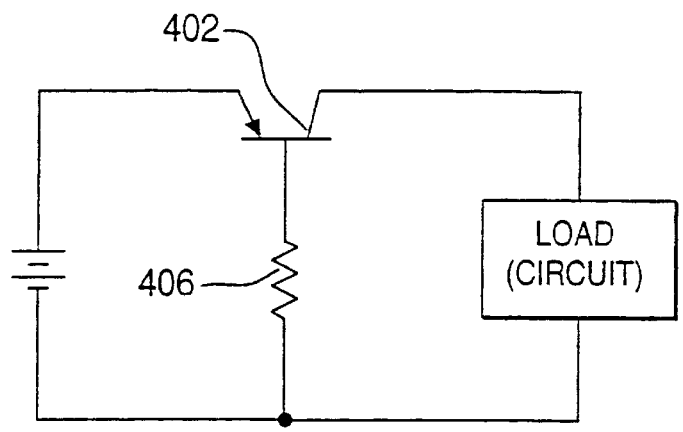
FIGS. 4(a) and 4(b) are circuit diagrams of the automatic switch shown in FIG. 3 including a single bipolar transistor.

This switch and voltage comparator may be implemented as an automatic switch included in a custom integrated circuit (IC) containing the load circuitry. FIG. 4(a) shows one embodiment of the present invention including a single bipolar transistor in the IC. The circuit shown uses PNP bipolar transistor 402 to implement the switch. The transistor may also serve as a voltage comparator, with its base-emitter junction acting as the reference voltage. Resistor 406 limits the base current into transistor 402. If the battery voltage is below the base-to-emitter forward bias voltage drop (approximately 0.4–0.5 volts), transistor 402 is turned "off." The transistor will not be turned "on," however, until the voltage of the battery source is approximately between 0.9 volts and 1.4 volts. This is due to resistor 406 having its own voltage drop, as soon as the base-emitter junction of transistor 402 becomes forward biased. Thus, the battery source is not connected to the load prior to its having an operational potential higher than the reference voltage by a predetermined voltage. The predetermined voltage is the voltage drop across resistor 406, when current is flowing through resistor 406.

It will be appreciated that a 2N4126 PNP transistor for transistor 402, and a 10 K-Ohms resistor for resistor 406 may be used. Such a circuit was tested at room temperature, using both a resistive load of 1 K-Ohms and no load. It may be shown that at a battery voltage of 0.4 volts, the voltage applied to the 1 K-Ohm load is approximately 0.03 mV and that the switch is turned "off." A battery current of approximately 30 nA resulted with the 1 K-Ohm load. Using this data, and assuming a two year shelf-life, approximately 0.53 mAh of battery capacity was used. This represents an improvement over the typical shelf-discharge of such a battery without an automatic switch. Of course, at a battery voltage of 1.40 volts, the transistor was turned "on" and the voltage applied to the load was approximately 1.33 volts.

Figure 4B:
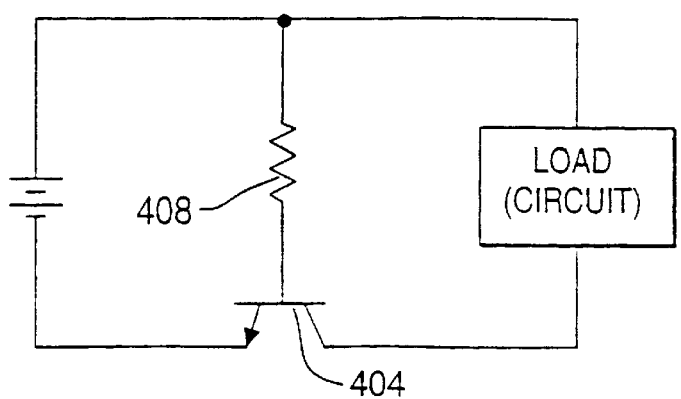

FIG. 4(b) shows another embodiment of the present invention including a single bipolar transistor. The circuit shown in FIG. 4(b) uses NPN bipolar transistor 404 instead of a PNP transistor. The base of transistor 404 is shown connected to resistor 408 which may be a 10 K-Ohm resistor. The operation of the circuit is similar to the PNP transistor circuit of FIG. 4(a).

Figure 5A:
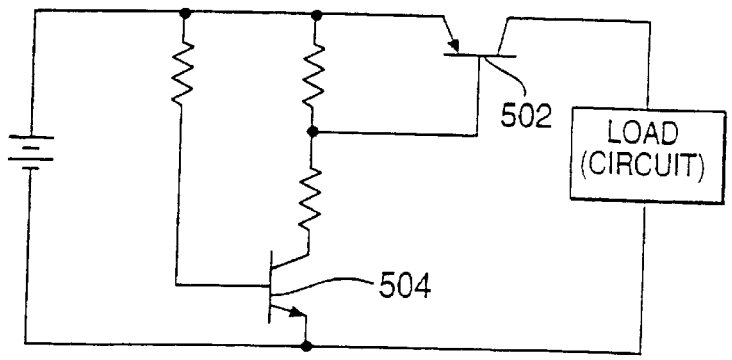
FIGS. 5(a) and 5(b) are circuit diagrams of the automatic switch shown in FIG. 3 including two transistors.
Figure 5B:
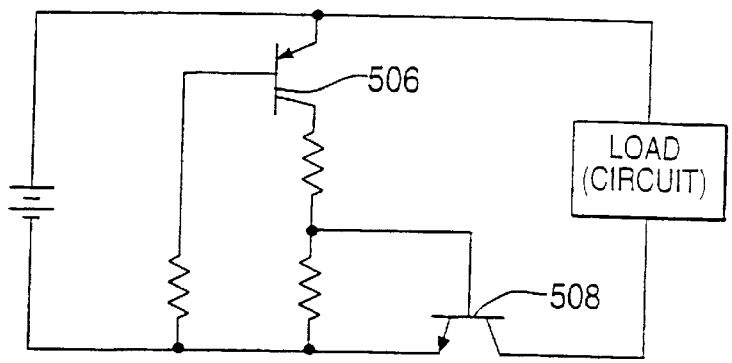

FIGS. 5(a) and 5(b) show another two embodiments of the present invention. The circuit shown in FIG. 5(a) uses a PNP transistor for the switch and a NPN transistor for the reference voltage/voltage comparator. The circuit shown in FIG. 5(b) uses a NPN transistor for the switch and a PNP transistor for the reference voltage/voltage comparator. Transistor 502 performs the function of the switch, and transistor 504 performs the function of the voltage comparator with its base-emitter junction providing the reference voltage level. The output of transistor 504 (collector lead) generates the control signal to transistor 502. When transistor 504 is forward biased and is fully on, the control signal is generated to the base of transistor 502. The base-emitter junction of transistor 502 is forward biased and, consequently, transistor 502 is turned on. With transistor 502 fully on, the battery source is connected across the load. When the control signal to the base of transistor 502 is removed, transistor 502 disconnects the load from the battery source. Similarly, in FIG. 5(b) transistor 508 performs the function of the switch and transistor 506 performs the function of the voltage comparator. The output of transistor 506 (collector lead) generates the control signal to switch transistor 508.

Figure 6A:
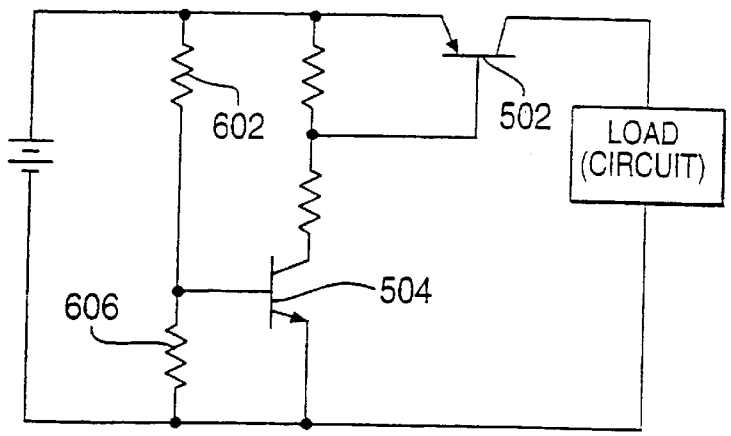
FIGS. 6(a) and 6(b) are circuit diagrams of the automatic switch shown in FIG. 3 including two-transistors and an adjustable threshold voltage.
Figure 6B:
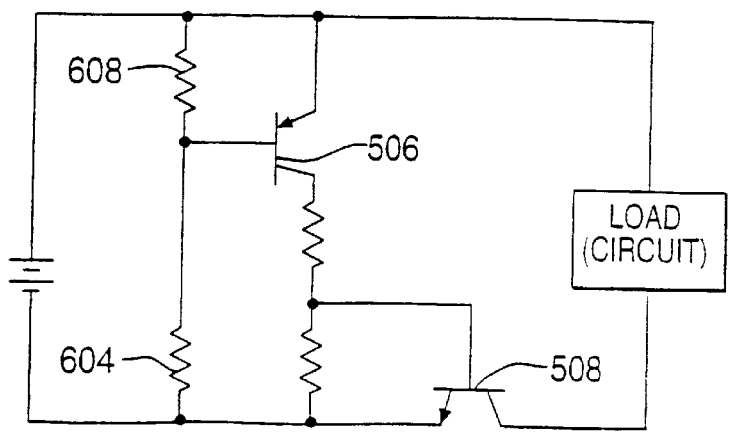

FIGS. 6(a) and 6(b) show two more embodiments of the present invention each including two-transistors and an adjustable threshold voltage. In FIGS. 6(a) and 6(b) resistor 606 and resistor 608, respectively, have been added. The battery source voltage at which the switch turns "on," may be given by the base-emitter voltage of transistor 504 and transistor 506, respectively, times (1+R1/R2), where R1 is the value of either resistor 602 in FIG. 6(a) or resistor 604 in FIG. 6(b), and R2 is the value of either resistor 606 in FIG. 6(a) or resistor 608 in FIG. 6(b). For example, if the base-emitter voltage of transistor 504 is 0.5 volts when the switch turns "on," then with resistors 602 and 606 set to 100 K-Ohms and 200 K-Ohms, respectively, the switch turns on at 0.5V×(1+100K/200K) or 0.75 volts.

The addition of these resistors, however, may result in a current flowing from the battery source through resistors 602 and 606 and through resistors 604 and 608, respectively. For a battery voltage of 0.4V, for example, with resistor 602 set at 100 K-Ohm, and resistor 606 set at 200 K-Ohm, the resulting battery current may be approximately 1.33 $\mu$A. Over a two year storage period, 23.4 $\mu$Ah of battery capacity may be used. In some applications such battery depletion may be acceptable. For disposable hearing aids, however, such battery depletion may be excessive.

Figure 7A:
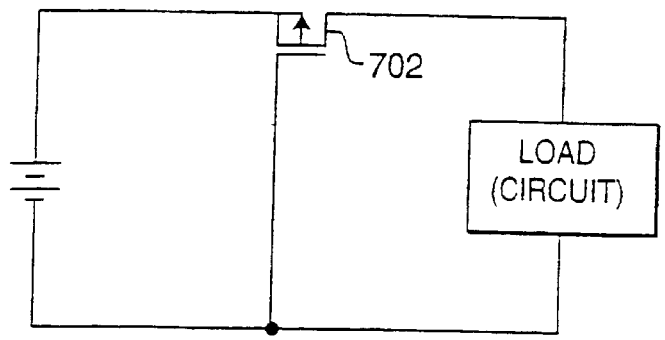
FIGS. 7(a) and 7(b) are circuit diagrams of the automatic switch shown in FIG. 3 including a single MOSFET.
Figure 7B:
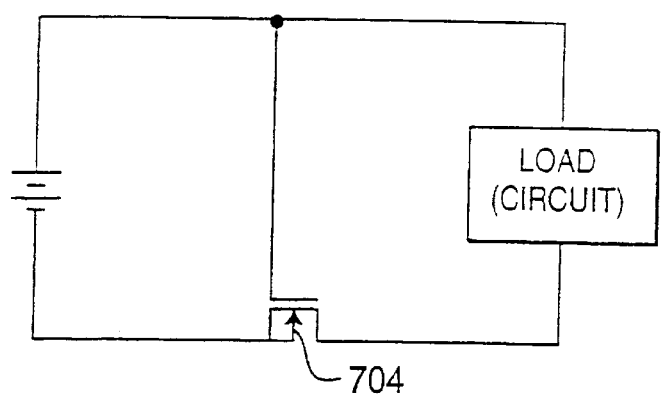

FIGS. 7(a) and 7(b) show two more embodiments of the present invention, each including a single MOSFET (metal-oxide semiconductor field-effect transistor). FIG. 7(a) shows P-channel MOSFET 702 and FIG. 7(b) shows N-channel MOSFET 704. When the battery source voltage is less than the gate-source turn-on potential (reference voltage) of MOSFET 702 or 704, the respective MOSFET is turned "off." When the battery source voltage exceeds the reference voltage, the MOSFET starts to slowly turn "on." The MOSFET is not fully turned-on until the reference voltage is exceeded by a predetermined voltage. The predetermined voltage is a function of the MOSFET fabrication design, and is understood in the art. When the battery source voltage is exceeded by a predetermined amount, the MOSFET connects the load to the battery. The MOSFET circuits shown in FIGS. 7(a) and 7(b) have advantage over the bipolar transistor circuits of FIGS. 4(a) and 4(b) in that the MOSFET gate does not draw current like the base-emitter does in the bipolar transistor. Therefore, when the MOSFET switch is turned "off," a lesser current drain on the battery results.

Figure 8A:
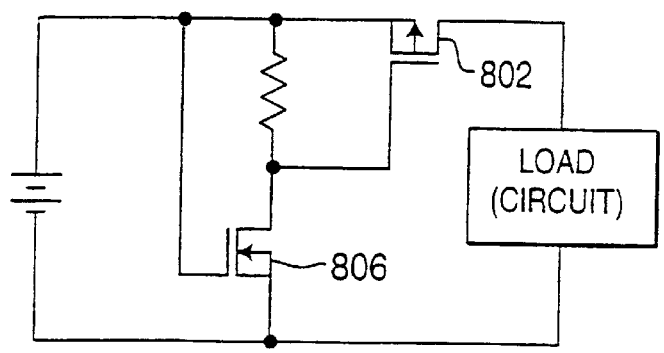
FIGS. 8(a) and 8(b) are circuit diagrams of the automatic switch shown in FIG. 3 including two MOSFETs.
Figure 8B:
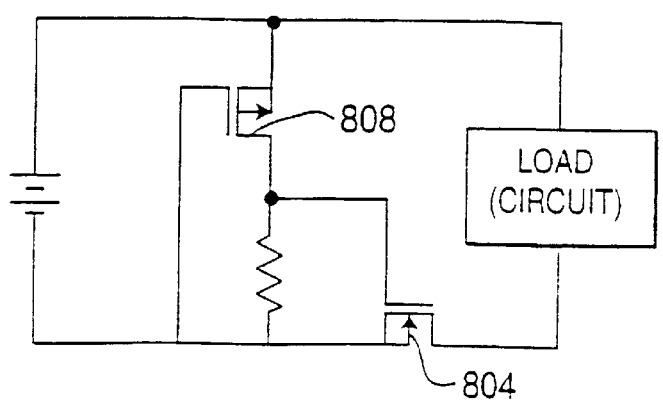

FIGS. 8(a) and 8(b) show two more embodiments of the present invention each including two MOSFETs. MOSFETs 802 and 804 each performs the function of a switch. MOSFETs 806 and 808 each performs the functions of a voltage comparator. The operations of the MOSFET circuits of FIGS. 8(a) and 8(b) are similar to the operations of the bipolar-transistor circuits of FIGS. 5(a) and 5(b), respectively. For example, FET 806 generates the control signal through its drain, when the gate-source turn-on potential is exceeded by a predetermined voltage. The drain of FET 806 is connected to the gate of FET 802 and a resistor, as shown. When the control signal is generated, FET 802 connects the load to the battery source.

Figure 9A:
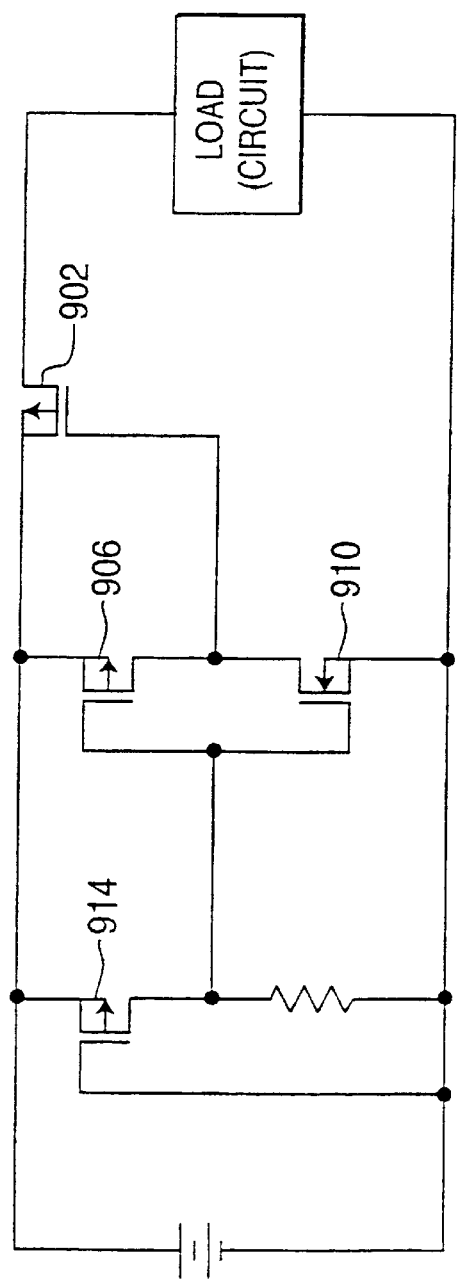
FIGS. 9(a) and 9(b) are circuit diagrams of the automatic switch shown in FIG. 3 including multiple MOSFETs.
Figure 9B:
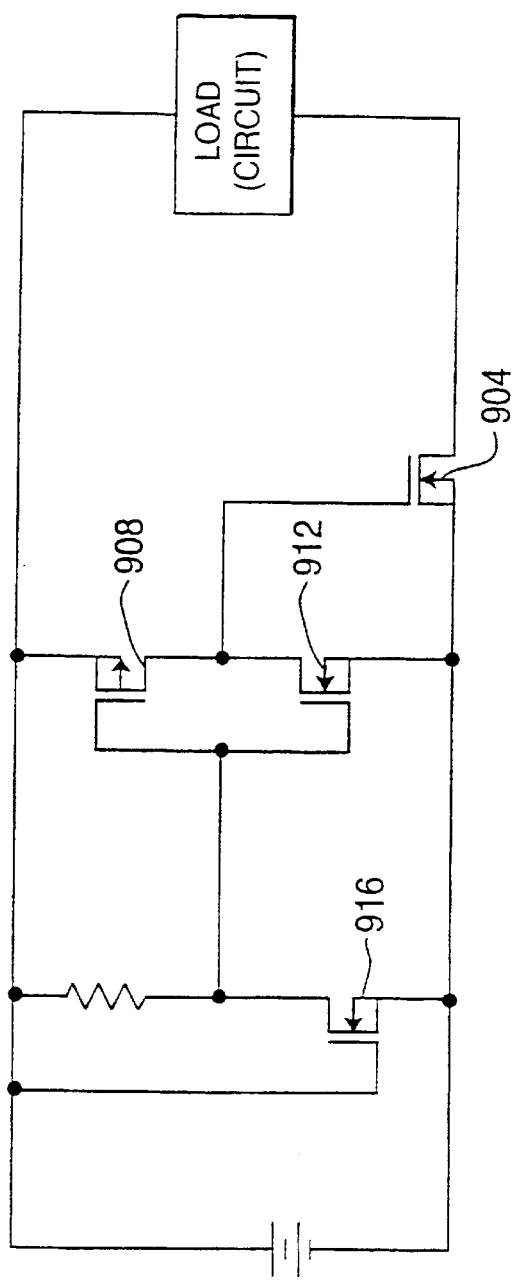

FIGS. 9(a) and 9(b) show the final two embodiments of the present invention, each including multiple MOSFETs. MOSFET 902 and 904, respectively, perform the function of the switch. MOSFETs 914 and 916, respectively, perform the function of the voltage comparator; MOSFETs 906 and 910, in FIG. 9(a), and MOSFETs 908 and 912, in FIG. 9(b), respectively, provide the function of an inverting amplifier. The inverting amplifier is connected between the drain of FET 914 (for example) and the gate of FET 902 (for example). It will be appreciated that the inverting amplifier provides higher gain than the previous FET embodiments, and consequently, results in a sharper transition between the "on" and "off" states of the switch (FET 902, for example).

It will be appreciated that the circuits having MOSFETs may exhibit low operating currents, both in the "on" and "off" switch states, compared with similar bipolar transistor circuits. Bipolar transistors require a base current to operate, while MOSFET transistors do not require a gate current. In addition, the use of MOSFET transistors is advantageous because easy integration is possible within an integrated circuit employing standard CMOS (complementary metal-oxide semiconductor) processes. Further, the use of MOSFET transistors provides the flexibility of altering the threshold voltage of the MOSFET device through changes in the IC fabrication process. Hence, each MOSFET may be adapted for its intended circuit function. For example, FETs 902 and 904 may be designed for low "on" resistance, while FETs 914 and 916 may be designed for a proper voltage reference with low operating current.

For hearing aid applications, and in particular disposable hearing aid applications, the load circuit may be designed to operate at power supply voltages as low as approximately 1.1 volts. Below such a voltage, the transistors in the load circuit may not have sufficient potential to operate properly and may go into a standby mode. At a battery voltage below approximately 0.4 volts, the hearing aid circuit may be non-operational. Leakage current in the load circuit from only a few transistors may contribute to the flow of battery current during the shelf life of the device. Depriving the battery of oxygen to assist in lowering the battery voltage from approximately 1.4 volts to approximately 0.4 volts is helpful in implementing the present invention. Oxygen deprivation may be sufficient to extend the shelf life of the device, if the circuit enters a low-current state at a relatively low battery voltage, for example, approximately 0.4 volts. If leakage currents in the device cannot be kept sufficiently low, the automatic switch described in the foregoing embodiments may be useful in preventing any leakage during the shelf life of the device.

Figure 10:
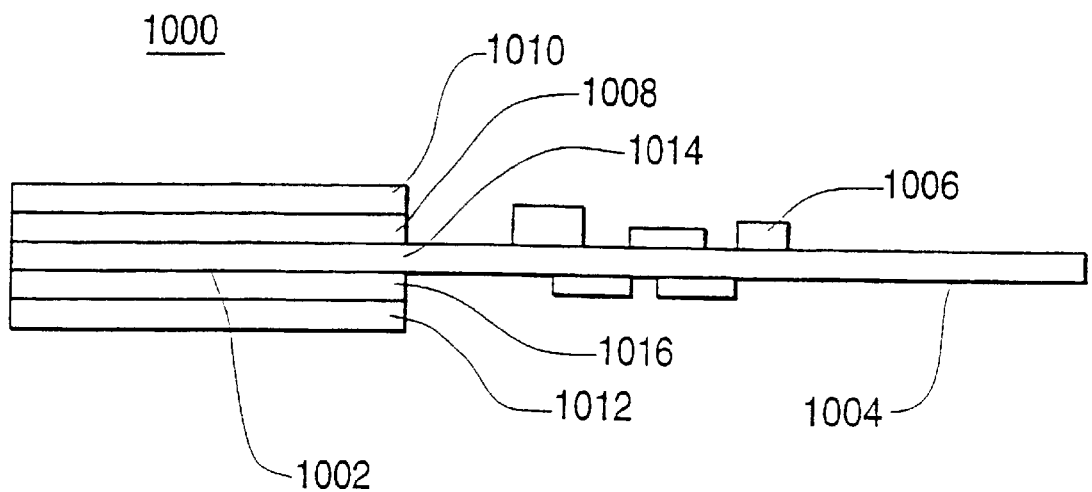
FIG. 10 is a cross-section of an air cathode flex-circuit assembly in accordance with an embodiment of the present invention.

Turning next to a general method for placing electronics in a battery housing, which may be useful in the manufacture of integrated electronics within a hearing aid, FIGS. 10–13 will now be described. It will be appreciated that the following description is not limited to only integrated electronics for a hearing aid but may be applied for use in any application requiring a disposable battery. FIGS. 10 and 12 show an air cathode flex circuit 1000, including cathode electrode area 1002, anode electrode area 1004, and electronic components (load) area 1006. The flex circuit provides the capability for integrating electronics within a battery structure. The flex circuit may be constructed from a substrate such as polyimide with conductive traces. Conductive traces may include a metal foil, and may serve as a current collector. These traces may be formed of copper; or copper coated with nickel, gold, silver, or platinum to inhibit corrosion of the traces due to the presence of an electrolyte. Cathode electrode area 1002 includes several holes or openings to allow oxygen to pass through. The flex circuit also provides the mechanical strength to support carbon matrix 1008 and carbon matrix 1016. A microporous, hydrophobic layer 1010 formed from Teflon (a trademark of DuPont) is placed over carbon matrix 1008 to inhibit leakage of the electrolyte. Direct contact between the cathode and the anode is prevented by separator layer 1012.

Cathode electrode 1002 and anode electrode 1004 may be placed on both surfaces of flex circuit layer 1014. These electrodes, however, may be located on only one surface and need not be positioned on the same surface. To protect electronic components 1006 from the corrosive effects of the electrolyte, the complete flex-circuit assembly, including electronic components, but excluding anode 1004 and cathode 1002 areas, may be coated with a protective coating such as parylene.

Figure 11:
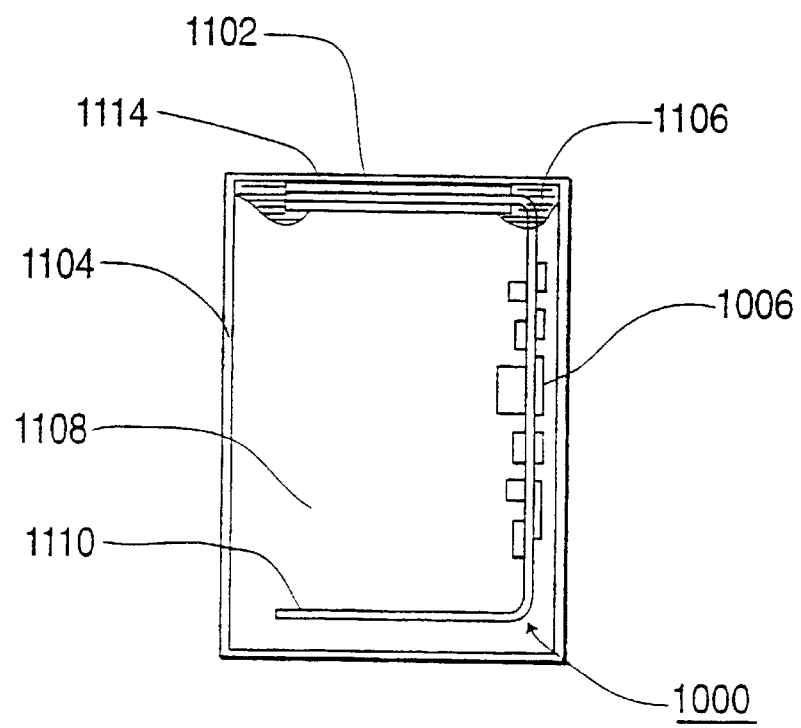
FIG. 11 is a cross-section of the flex circuit assembly inserted into a battery housing in accordance with an embodiment of the present invention.
Figure 12:
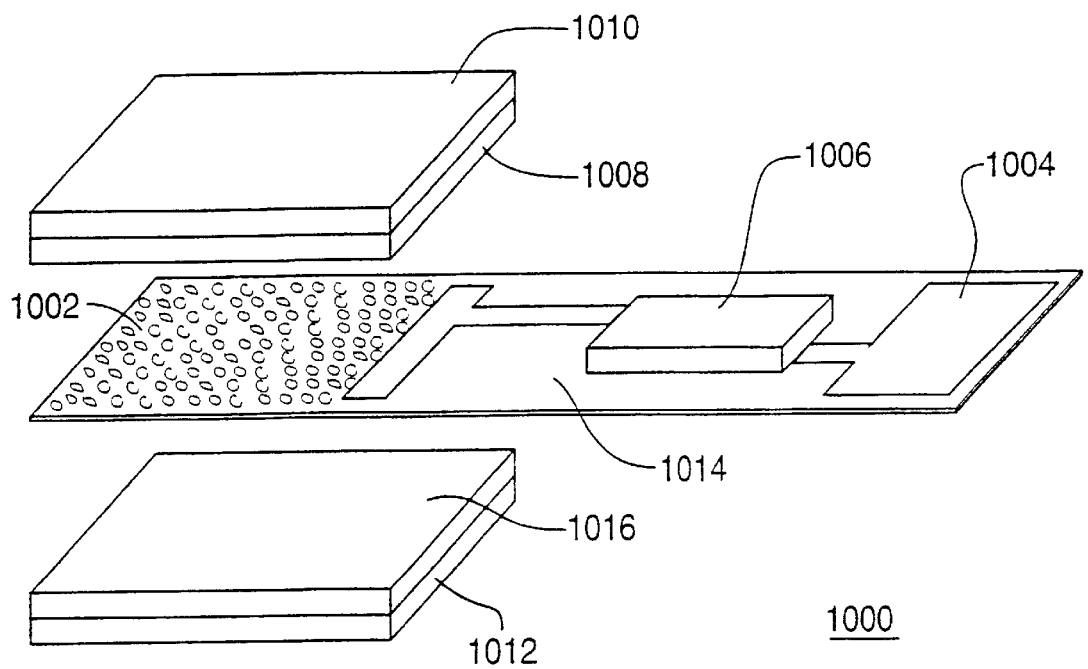
FIG. 12 is an isometric view of the flex circuit assembly shown in FIG. 10.

FIG. 11 shows flex circuit 1000 inserted into battery housing 1104. Air cathode 1002 may be sealed to battery housing 1104 by using epoxy for seal 1106. Alternatively, a gasket material may be used for seal 1106. It will be appreciated that seal 1106 is helpful in preventing electrolyte 1108 from leaking out of battery housing 1104. It will also be understood that battery housing 1104 may contain a metal anode mixture as well as electrolyte 1108. The anode mixture may include gelling agents, surfactants, zinc, zinc-oxide, aluminum, mercury, indium, gallium, or other materials used in making metal-air batteries. Electrolyte 1108 may be, for example, potassium hydroxide, sodium hydroxide, or another electrolyte used in making batteries. The anode may include a metal such as zinc, aluminum, calcium, magnesium, lithium or iron. Currently, zinc is the preferred metal for hearing aid applications.

Figure 13:
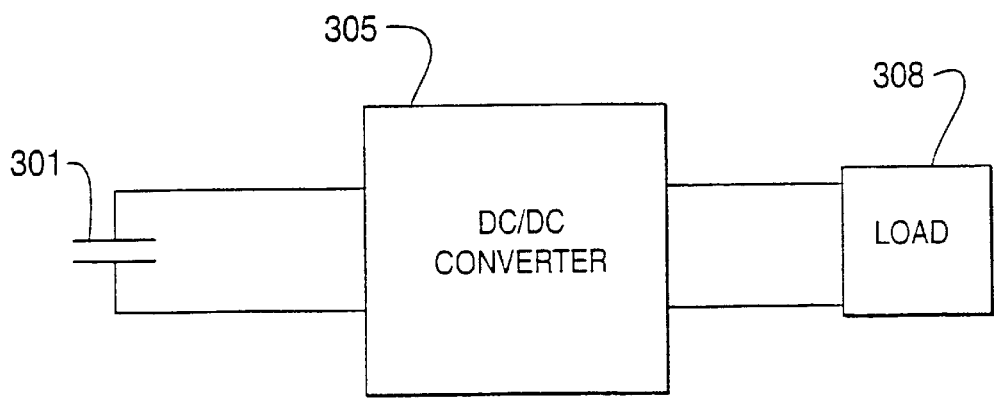
FIG. 13 is a circuit diagram of a hearing aid load powered by a storage capacitor.

A final embodiment, shown in FIG. 13, is a power source for a hearing aid using a capacitor, including high-capacity super capacitors, as an energy storage device to provide an operating potential. Energy may be stored in capacitor 301 at a voltage higher than the voltages required to operate hearing aid load 308. For example, hearing aid load 308 may operate within a range of 1.1 to 1.5 volts. Storing energy at a higher voltage helps increase the amount of energy that may be delivered by capacitor 301, and hence may increase the operating time of the capacitor-powered device. DC/DC converter 305 may be used to convert the higher voltage to a lower voltage. In this manner, more energy may be delivered by capacitor 301 before insufficient voltage remains for load 308 to operate. For example, if the initial voltage is 5.0 volts and the final voltage is 1.1 volts, then 95.2% of the energy initially stored in the capacitor may be used. If, for example, the initial voltage is 10.0 volts and the final voltage is 1.1 volts, then 98.8% of the energy initially stored in the capacitor may be used. Because more energy may be delivered to the load, operating life is extended beyond that of the capacitor power supply disclosed in U.S. Pat. No. 5,712,919.

The value of the capacitance needed to power a device, such as a hearing aid, for a given length of time is given by the following equation:

$$C = (2 \cdot P_o \cdot \Delta t)/(V_i^2 - V_f^2),$$

where $P_o$ is the output power, $\Delta t$ is the length of time (operating life), $V_i$ is the initial voltage across the capacitor, and $V_f$ is the final voltage across the capacitor. For example, if a one day operating life is desired, with output power of 600 $\mu$W, initial voltage of 10 V, and final voltage of 1.1 V, then a capacitance of 1.05 F (farads) results.

Double-layer capacitors having a large capacitance relative to their size are commercially available. For example, Panasonic part number EEC-W5R5D335 is a 1.0 F, 5.5V capacitor. Four of these capacitors connected in series and in parallel, may form a 2.0 F, 11V capacitor. The physical volume of these four capacitors is about 11.6 cm$^3$. In contrast, the capacitor power source disclosed in U.S. Pat. No. 5,712,919, may use a 13.8 F capacitor, with initial and final voltages of 1.4 volts and 1.1 volts, respectively. Three Panasonic 2.5 V capacitors, each part number EEC-A0EL475, with capacitance of 4.7 F, connected in parallel may be used to form such a 13.8 F capacitor. The physical volume of these three capacitors is about 51.6 cm$^3$, which is approximately 4.45 times larger.

The physical volume needed for a zinc-air battery with an operating lifetime of about 30 days is approximately 0.35 cm$^3$. The physical volume of double-layer capacitors may be too large currently to power such small devices. As technology advances, however, smaller capacitors may become available. Other applications, however, such as a two hour hearing aid device for special events or movies, may use a capacitor with capacitance of 0.087 F (assuming an initial voltage of 10 V). Such a capacitor may occupy a physical volume of approximately 4.3 cm$^3$. Additionally, behind the ear (BTE) hearing aids may be designed to be powered by energy stored in a capacitor located in the hearing aid or located elsewhere and connected to the hearing aid by a cable.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention. It will be understood, for example, that the present invention is not limited to only operating voltages of hearing aids described herein. Other operating ranges may also be used. Furthermore, the invention may be extended to devices other than hearing aids, for example, any mobile device requiring a power source may benefit from the disclosure described herein. Temperature monitoring of foods and pharmaceuticals during transportation may take advantage of the embodiments described. A disposable, zinc-air powered temperature monitor may record and store temperature profiles during transportation. The temperature profiles may be examined after transportation to verify temperature extremes have not been exceeded. The embodiments described may also be useful in short-term medical monitoring applications.

What is claimed:

1. An electronic device including a switch for controlling power to a load, said electronic device comprising:
    a metal-air battery power source that produces a lower voltage output when the power source is deprived of an activating gas or a higher voltage output when exposed to an activating gas;
    a voltage comparator connected to said power source, said voltage comparator including a reference voltage that is compared to said voltage output of said power source to generate a control signal indicative of whether the power source is or is not exposed to the activating gas; and
    a switch responsive to said control signal that selectively connects the power source to said load, the switch connecting said power source to said load when said voltage level of said power source exceeds said reference voltage level by a predetermined voltage and said switch disconnecting the power source from said load when said voltage level of said power source is below said reference voltage level.

2. An electronic device as in claim 1 further comprising:
    a bipolar transistor having a base-emitter junction and a collector-emitter junction, the base-emitter of the bipolar transistor being controlled by the voltage of the battery so that the base-emitter of the bipolar transistor is forward biased when the voltage of the battery is above a threshold of the base-emitter, the collector-emitter junction of the bipolar transistor being disposed to connect the battery to the load depending on whether the base-emitter junction of the bipolar transistor is forward biased.

3. An electronic device as in claim 1 further comprising:
a first bipolar transistor having a base-emitter junction, the base-emitter of the first bipolar transistor being controlled by the voltage of the battery so that the first bipolar transistor is turned on when the voltage of the battery is above a threshold of the base-emitter of the first bipolar transistor, the first bipolar transistor in communication with a second bipolar transistor that connects the battery to the load when the base-emitter junction of the first bipolar transistor is forward biased.

4. An electronic device as in claim 3, wherein the comparator includes a resistor divider circuit to produce a derivative voltage that is used to forward bias the base-emitter junction of the first transistor.

5. An electronic device as in claim 1, wherein the metal-air battery is a zinc-air cell.

6. An electronic device as in claim 1, wherein the load includes electronics of a hearing aid device.

7. An electronic device as in claim 1 further comprising:
a first field-effect transistor having a gate-source junction, the gate-source junction having a gate-source turn-on potential that is the reference voltage of the comparator, the voltage of the battery source connected across the junction of the transistor so that the field-effect transistor connects the battery source to the load when the voltage of the battery exceeds the gate-source turn-on potential by a predetermined voltage and the field-effect transistor disconnects the battery source from the load when the voltage of the battery is less than the gate-source turn-on potential.

8. An electronic device as in claim 7, wherein a second field-effect transistor is responsive to the control signal generated by the comparator, the second field effect transistor connecting the battery to the load when the voltage of the battery exceeds the gate-source turn-on potential of the first transistor by a predetermined voltage.

9. An electronic device as in claim 8, wherein at least one of the transistors function as an amplifier.

10. An electronic device as in claim 1, wherein the metal-air battery can be deprived of oxygen to turn the battery in an off state so that the battery is disconnected from the load and the battery can be exposed to oxygen to turn the battery in an on state so that the battery is connected to the load.

11. A method of preventing discharge of unused energy stored in a power source, the method comprising:
exposing or depriving the power source of an activating gas, the power source producing a voltage output that varies depending on whether the power source is exposed to the activating gas;
generating a control signal that depends on the voltage output of the power source; and
via the control signal, selectively connecting the voltage output of the power source to a load depending on whether power source is exposed to an activating gas.

12. A method as in claim 11, wherein the activating gas is air.

13. A method as in claim 11, wherein the load is electronics disposed in a hearing aid device.

14. A method as in claim 13, wherein the hearing aid device is disposable.

15. A method as in claim 11 further comprising:
comparing the voltage output of the power source to a threshold voltage to generate the control signal that is used to selectively connect the power source to the load.

16. A method as in claim 11, wherein the power source is a zinc-air cell.

17. A method of preventing a discharge of unused energy stored in a power source, the method comprising:
exposing or depriving the power source of an activating gas, the power source producing a voltage output that varies depending on whether the power source is exposed or deprived of the activating gas; and
applying the voltage output signal of the power source to a switch device that connects the voltage output of the power source to a load when the power source is exposed to an activating gas, the switch device otherwise disconnecting the power source from the load when the power source is deprived of an activating gas.

18. A method as in claim 17, wherein the activating gas is air.

19. A method as in claim 17, wherein the load is electronics disposed in a hearing aid device.

20. A method as in claim 19, wherein the hearing aid device is disposable.

21. A method as in claim 17, wherein the switch device is an FET (Field Effect Transistor).

22. A method as in claim 21 further comprising:
connecting the voltage output of the power source to a gate of the FET (Field Effect Transistor).

23. A method as in claim 7, wherein the switch device is a bipolar junction transistor.

24. A method as in claim 23 further comprising:
connecting the voltage output of the power source to a base of the bipolar junction transistor.

25. A method as in claim 17 further comprising:
connecting the voltage output of the power source to the load when the voltage output is in a range between 0.4 and 1.4 volts.

26. A method as in claim 17 further comprising:
disconnecting the voltage output of the power source from the load when the voltage output is in a range between 0.39 and 0.6 volts.

27. An electronic device including a switch for controlling power to a load in order to prevent discharge of unused energy, said electronic device comprising:
a metal-air battery power source that produces a lower voltage output when the power source is deprived of an activating gas or a higher voltage output when exposed to an activating gas;
a voltage comparator connected to said power source, said voltage comparator generating a control signal indicative of whether the power source is or is not exposed to the activating gas; and
a switch responsive to said control signal that selectively connects the power source to said load depending on whether the metal-air battery is deprived of an activating gas.

* * * * *